United States Patent
Fujimoto et al.

(10) Patent No.: US 8,771,132 B2
(45) Date of Patent: Jul. 8, 2014

(54) TRANSFER INCORPORATING WET BRAKE

(75) Inventors: Akihiko Fujimoto, Sagamihara (JP); Shigeyoshi Umeda, Sagamihara (JP)

(73) Assignee: Mitsubishi Nichiyu Forklift Co., Ltd., Kyoto (JP)

( * ) Notice: Subject to any disclaimer, the term of this patent is extended or adjusted under 35 U.S.C. 154(b) by 280 days.

(21) Appl. No.: 13/142,448

(22) PCT Filed: Sep. 28, 2009

(86) PCT No.: PCT/JP2009/066767
§ 371 (c)(1),
(2), (4) Date: Jul. 27, 2011

(87) PCT Pub. No.: WO2010/079642
PCT Pub. Date: Jul. 15, 2010

(65) Prior Publication Data
US 2011/0275468 A1    Nov. 10, 2011

(30) Foreign Application Priority Data
Jan. 7, 2009 (JP) ................................. 2009-001391

(51) Int. Cl.
*F16H 3/44* (2006.01)

(52) U.S. Cl.
USPC ........................................................ 475/311

(58) Field of Classification Search
USPC ........................................................ 475/311
See application file for complete search history.

(56) References Cited

U.S. PATENT DOCUMENTS

| | | | | |
|---|---|---|---|---|
| 5,435,793 A | * | 7/1995 | Varela et al. | 475/311 |
| 2005/0009663 A1 | * | 1/2005 | Kingston et al. | 475/331 |
| 2007/0219043 A1 | * | 9/2007 | Moon | 475/311 |

FOREIGN PATENT DOCUMENTS

| | | |
|---|---|---|
| DE | 196 33 071 A1 | 2/1998 |
| EP | 1 837 224 A2 | 9/2007 |
| JP | 63-143482 U | 9/1988 |
| JP | 2-140039 A | 11/1990 |
| JP | 2005-29117 A | 2/2005 |
| JP | 2005-263140 A | 9/2005 |
| JP | 2006-298361 A | 11/2006 |
| JP | 2007-120559 A | 5/2007 |
| JP | 2008-37303 A | 2/2008 |

OTHER PUBLICATIONS

Extended European Search Report dated May 29, 2012.
Chinese Office Action issued in Chinese Patent Application No. 200980154113.4 on Jul. 19, 2013.

* cited by examiner

*Primary Examiner* — David D Le
*Assistant Examiner* — Steven B Christ
(74) *Attorney, Agent, or Firm* — Birch, Stewart, Kolasch & Birch, LLP

(57) ABSTRACT

A brake hub (36) and a second gear shaft (22) are rotatably supported by a bearing (42) and a bearing (43), the bearing (42) interposed between a projection (11D-1) of a support member (11D) disposed on the inner side of a recess (36a) of the brake hub and the inner peripheral surface of the recess, the bearing (43) interposed between a support member (11E) surrounding a top end portion of the brake hub and the top end portion of the brake hub. The transfer further comprises a disc pressing pin (50) inserted through a hole (11D-4) in the support member, a pressing plate (51) disposed on the outer side of the support member, and plate pressing means. The plate pressing means presses the pressing plate, the pressing plate presses the disc pressing pin, and the disc pressing pin presses a press brake disc (35C).

8 Claims, 4 Drawing Sheets

TRANSFER INCORPORATING WET BRAKE

BACKGROUND OF THE INVENTION

1. Field of the Invention

The present invention relates to a transfer incorporating a wet brake.

2. Description of the Related Art

FIG. 4 is a cross-sectional view of a conventional transfer incorporating a wet brake (see Patent Document 1).

The conventional transfer incorporating a wet brake shown in FIG. 4 includes, in a case 101, a first gear (input gear) 102, a second gear (drive gear) 103, a wet brake 104, a sun gear 105, a ring gear 106, and multiple planetary gears 107, and further includes an output shaft 108 whose top end side protrudes from the case 101. Accordingly, the rotational force of an electric drive unit 109 is transmitted to the output shaft 108 through the first gear 102, the second gear 103, the sun gear 105, and the planetary gears 107 of this transfer. Thereby, a driving wheel 110 mounted on the output shaft 108 is driven to rotate.

Moreover, in this transfer, a brake disc unit 113 in the wet brake 104 for braking the driving wheel 110 is attached to a base end portion of a gear shaft 111 that serves as a rotary shaft for the second gear 103 and the sun gear 105. The gear shaft 111 is rotatably supported by a single bearing 112.

PRIOR ART DOCUMENTS

Patent Documents

Note that the prior art documents related to the present application include the followings.
Patent Document 1: JP-A 2008-037303
Patent Document 2: JP-A 2006-298361

SUMMARY OF THE INVENTION

Problems to be Solved by the Invention

In the conventional transfer incorporating a wet brake, the mechanically pressing of the brake disc unit 113 of the wet brake 104 from the outside of the transfer through a link mechanism is desirably conducted at one point of a central portion thereof in order to avoid a complex configuration of the link mechanism and to press the brake disc unit 113 uniformly.

For these achievements, however, it is structurally necessary that the gear shaft 111 on which the brake disc 113 is mounted be supported by the single bearing 112. In addition, when helical gears are employed as the second gear 103 and the sun gear 105 on the gear shaft 111, a force in an axial direction of the gear shaft 111 and an overturning moment are applied to the single bearing 112. As a result, the following problems occur.

(1) The gear shaft 111 tilts due to a gap inside the bearing 112. Thereby, the mesh condition between the second gear 103 and the first gear 102 and the mesh condition between the sun gear 105 and the planetary gear 107 are deteriorated, and gear noises are likely to be generated. The tilting of the gear shaft 111 is also influenced by torque transmitted to gears and the precision of the bearing part. The tilting makes the above mesh conditions unstable and causes various gear noises as well.

(2) Since the overturning moment is applied to the single bearing 112, the lifetime of the bearing 112 is shortened.

Meanwhile, if an additional bearing is provided to the gear shaft 111 in a structure similar to that in FIG. 4 to thus support the gear shaft 111 with two bearings, the additional bearing has to be provided closer to the sun gear 105 (planetary reduction mechanism at the next stage). To put it differently, the additional bearing has to be provided closer to the output shaft 108. This brings about problems of an increase in the axial dimension of the transfer, complex structure of the transfer, and poor assemblability of the transfer.

Furthermore, in this case, the gear shaft 111 is constrained to the output shaft 108 side. In this state, when the center of the gear shaft 111 is misaligned with the center of the ring gear 106 due to a dimensional error, the misalignment cannot be adjusted. Consequently, the amount of torque to be transmitted may differ among the planetary gears 107. Hence, some scheme for solving such a problem is required.

Thus, the present invention has been made in view of the above-described circumstances. An object thereof is to provide a transfer incorporating a wet brake which enables a gear shaft for a second gear and a sun gear to be supported by two bearings without causing inconveniences such as an increase in the axial dimension of the transfer, and which is further capable of, for example, solving problems caused by a misalignment between the rotation centers of the gear shaft and a ring gear.

Means for Solving the Problems

A transfer incorporating a wet brake of a first invention to solve the above problems, comprises, in a case: a first gear having a first gear shaft connected to a rotary shaft of a driving source; a second gear having a second gear shaft and meshing with the first gear; a wet brake disposed on a base end side of the second gear shaft; a sun gear provided at a top end portion of the second gear shaft; a ring gear disposed in such a manner as to surround the sun gear; and a plurality of planetary gears disposed between the sun gear and the ring gear and meshing with the sun gear and the ring gear; and further comprising: an output shaft having a base end portion to which third gear shafts of the planetary gears are attached and having a top end side protruding from the case, the transfer incorporating a wet brake thereby configured to transmit a rotational force of the driving source to the output shaft through the first gear, the second gear, the sun gear, and the planetary gears, the transfer incorporating a wet brake characterized in that the wet brake includes: a brake hub provided in such a manner as to be rotatable with the second gear and the second gear shaft in an integrated manner; a rotating-side brake disc attached to an outer peripheral portion of the brake hub; a fixed-side brake disc disposed in such a manner as to face the rotating-side brake disc; and a press brake disc for pressing the rotating-side brake disc and the fixed-side brake disc, the brake hub and the second gear shaft are rotatably supported by a first bearing and a second bearing, the first bearing interposed between a projection of a first support member of the case and an inner peripheral surface of a recess formed on a base end of the brake hub, the projection disposed on an inner side of the recess, the second bearing interposed between a second support member of the case and a top end portion of the brake hub, the second support member surrounding the top end portion of the brake hub, the transfer further comprises: a plurality of disc pressing pins respectively inserted through a plurality of holes formed in the first support member;

a pressing plate disposed on an outer side of the first support member; and plate pressing means, and the transfer incorporating a wet brake is thereby configured such that the plate pressing means presses the pressing plate, the pressing plate presses the disc pressing pins, and the disc pressing pins press the press brake disc.

A transfer incorporating a wet brake of a second invention according to the transfer incorporating a wet brake of the first invention is characterized in that the pressing plate is disposed in a space section formed between the first support member of the case and a cover member of the case covering the first support member, the plate pressing means includes pin pressing means and a plate pressing pin inserted through a hole formed in the cover member, and the pin pressing means presses the plate pressing pin, and the plate pressing pin presses the pressing plate.

A transfer incorporating a wet brake of a third invention according to the transfer incorporating a wet brake of the second invention is characterized in that the plate pressing pin has: a head portion inserted through the hole formed in the cover member, and configured to press the pressing plate; a shank portion inserted through a hole formed in the pressing plate.

A transfer incorporating a wet brake of a fourth invention according to the transfer incorporating a wet brake of the third invention is characterized in that a gap is formed between an inner peripheral surface of the hole formed in the pressing plate and an outer peripheral surface of the shank portion of the plate pressing pin.

A transfer incorporating a wet brake of a fifth invention according to the transfer incorporating a wet brake of any one of the first to fourth inventions is characterized in that the brake hub is spline fitted to a base end portion of the second gear shaft.

Effects of the Invention

The transfer incorporating a wet brake of the first invention is the transfer incorporating a wet brake comprising, in a case: a first gear having a first gear shaft connected to a rotary shaft of a driving source; a second gear having a second gear shaft and meshing with the first gear; a wet brake disposed on a base end side of the second gear shaft; a sun gear provided at a top end portion of the second gear shaft; a ring gear disposed in such a manner as to surround the sun gear; and a plurality of planetary gears disposed between the sun gear and the ring gear and meshing with the sun gear and the ring gear; and further comprising: an output shaft having abase end portion to which third gear shafts of the planetary gears are attached and having a top end side protruding from the case, the transfer incorporating a wet brake thereby configured to transmit a rotational force of the driving source to the output shaft through the first gear, the second gear, the sun gear, and the planetary gears, the transfer incorporating a wet brake characterized in that the wet brake includes: a brake hub provided in such a manner as to be rotatable with the second gear and the second gear shaft in an integrated manner; a rotating-side brake disc attached to an outer peripheral portion of the brake hub; a fixed-side brake disc disposed in such a manner as to face the rotating-side brake disc; and a press brake disc for pressing the rotating-side brake disc and the fixed-side brake disc, the brake hub and the second gear shaft are rotatably supported by a first bearing and a second bearing, the first bearing interposed between a projection of a first support member of the case and an inner peripheral surface of a recess formed on a base end of the brake hub, the projection disposed on an inner side of the recess, the second bearing interposed between a second support member of the case and a top end portion of the brake hub, the second support member surrounding the top end portion of the brake hub, the transfer further comprises: a plurality of disc pressing pins respectively inserted through a plurality of holes formed in the first support member; a pressing plate disposed on an outer side of the first support member; and plate pressing means, and the transfer incorporating a wet brake is thereby configured such that the plate pressing means presses the pressing plate, the pressing plate presses the disc pressing pins, and the disc pressing pins press the press brake disc. Accordingly, the second gear shaft can be supported by two bearings, i.e., the first bearing and the second bearing. Thus, even when helical gears are employed as the second gear and the sun gear, the mesh condition between the first gear and the second gear and the mesh condition between the sun gear and the planetary gears are stable. Hence, gear noises are less likely to be generated, and the variation in the gear noises is also reduced.

Furthermore, the brake hub is supported on the inner side and the outer side thereof by the first bearing and the second bearing, and the press brake disc of the wet brake is pressed by a simple configuration of the disc pressing pins and the pressing plate. Accordingly, problems such as an increase in the axial dimension of the transfer, complex structure of the transfer, and poor assemblability of the transfer no longer occur.

The transfer incorporating a wet brake of the second invention is the transfer incorporating a wet brake of the first invention, wherein the pressing plate is disposed in a space section formed between the first support member of the case and a cover member of the case covering the first support member, the plate pressing means includes pin pressing means and a plate pressing pin inserted through a hole formed in the cover member, and the pin pressing means presses the plate pressing pin, and the plate pressing pin presses the pressing plate. Accordingly, the pressing plate can be surely pressed by the plate pressing means of a simple configuration.

The transfer incorporating a wet brake of the third invention is the transfer incorporating a wet brake of the second invention, wherein the plate pressing pin has: a head portion inserted through the hole formed in the cover member, and configured to press the pressing plate; a shank portion inserted through a hole formed in the pressing plate. Since the shank portion of the plate pressing pin is inserted through the holes in the pressing plate, the posture of the pressing plate is stabilized, and the pressing plate can be surely pressed by the head portion of the plate pressing pin.

The transfer incorporating a wet brake of the fourth invention is the transfer incorporating a wet brake of the third invention, wherein a gap is formed between an inner peripheral surface of the hole formed in the pressing plate and an outer peripheral surface of the shank portion of the plate pressing pin. The gap between the inner peripheral surface of the hole and the outer peripheral surface of the shank portion allows the pressing plate to tilt. Accordingly, even if the plurality of disc pressing pins are dimensionally different due to production errors, the dimensional error is absorbed by the tilting of the pressing plate, and thus the plurality of disc pressing pins can be surely pressed by the pressing plate.

The transfer incorporating a wet brake of the fifth invention is the transfer incorporating a wet brake of any one of the first to fourth inventions, wherein the brake hub is spline fitted to a base end portion of the second gear shaft. Accordingly, the second gear shaft is not constrained to the output shaft side. Moreover, the second gear shaft is spline fitted to the brake hub. Accordingly, even if the center of the second gear shaft is misaligned with the center of the ring gear due to a dimensional error, the misalignment is adjusted (absorbed at the spline fitting portion), making it possible to prevent torque from being transmitted ununiformly among the planetary gears.

DETAILED DESCRIPTION OF THE INVENTION

Hereinafter, an embodiment of the present invention will be described in detail with reference to the drawings.

Figure 1:
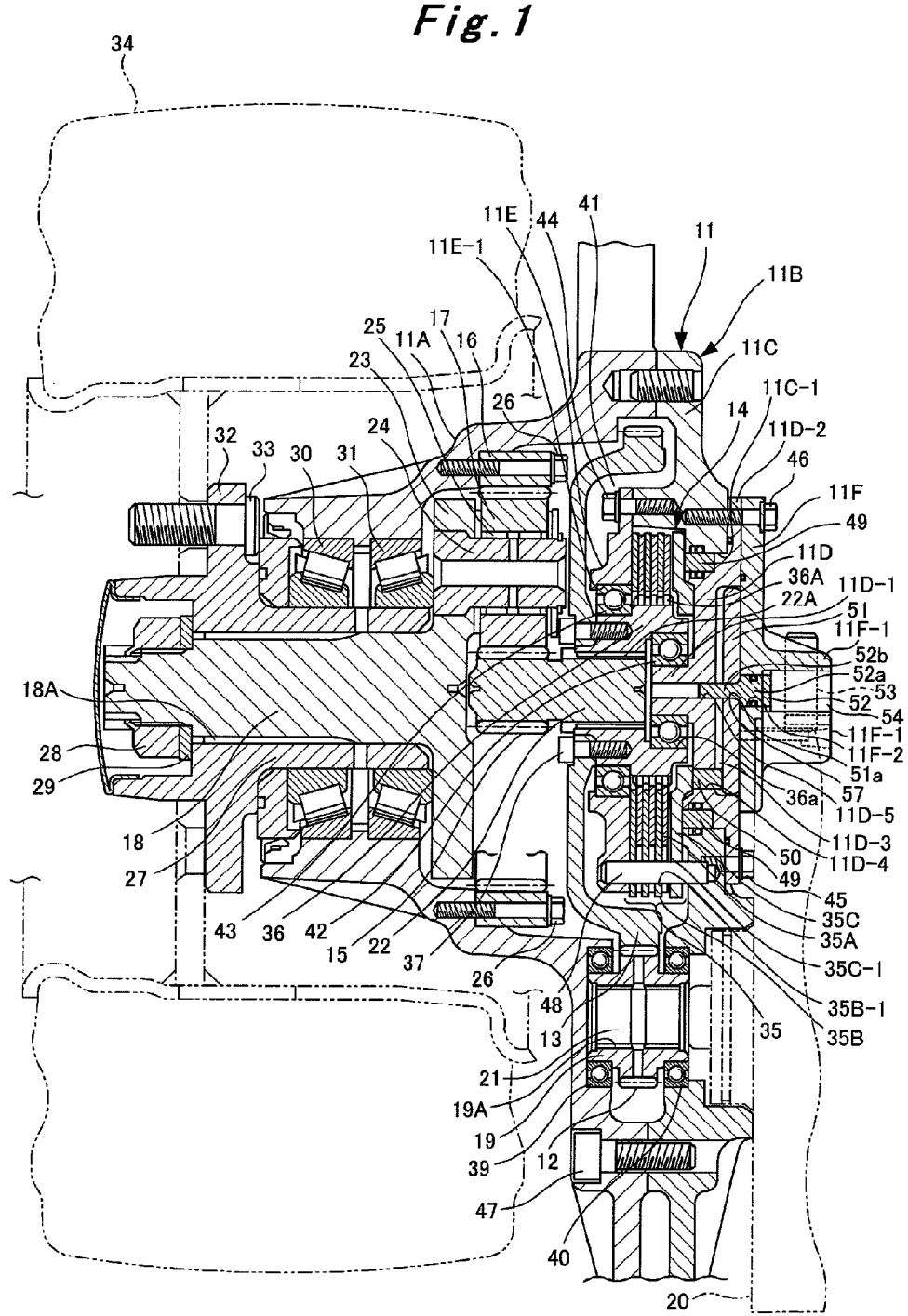
FIG. 1 is a cross-sectional view of a transfer incorporating a wet brake according to an embodiment example of the present invention.
Figure 2:
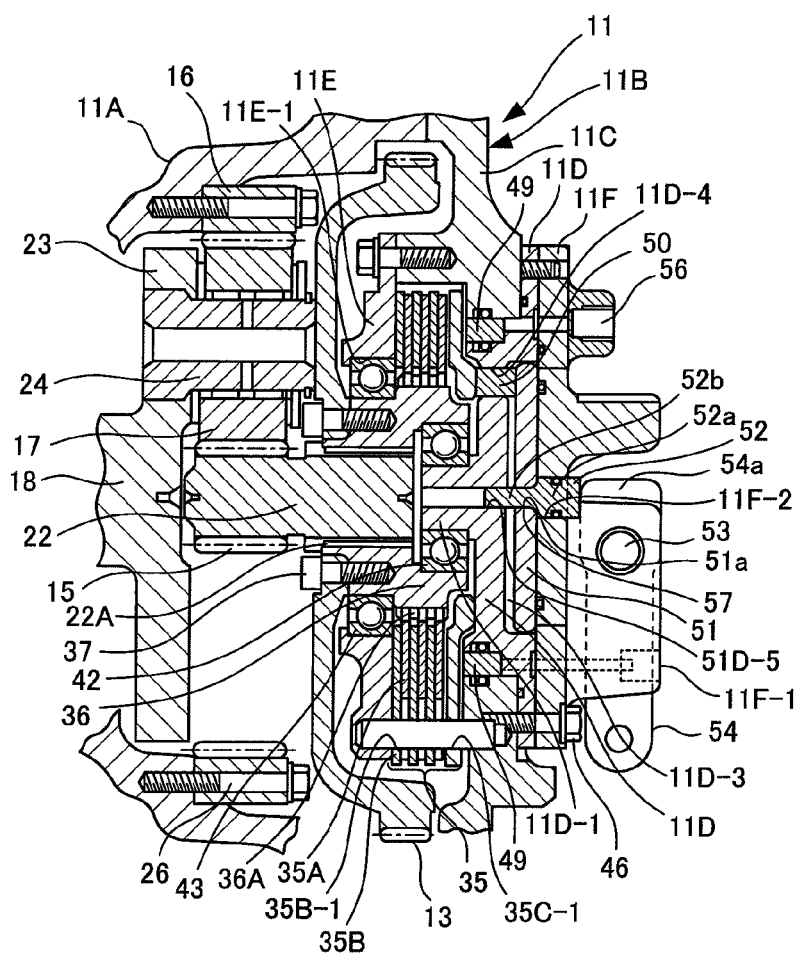
FIG. 2 is a cross-sectional view of the vicinity of a wet brake in the transfer incorporating a wet brake.
Figure 3:
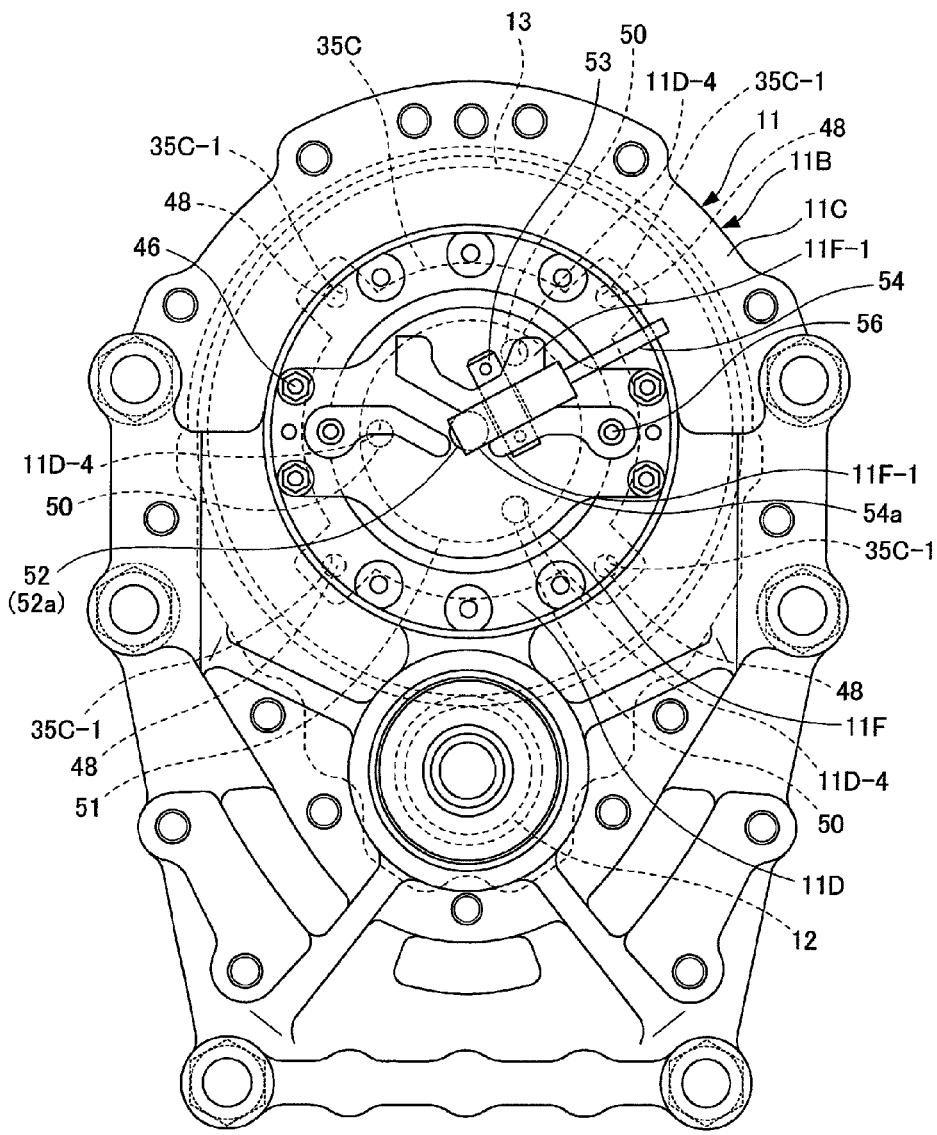
FIG. 3 is a side view of the transfer incorporating a wet brake.
Figure 4:
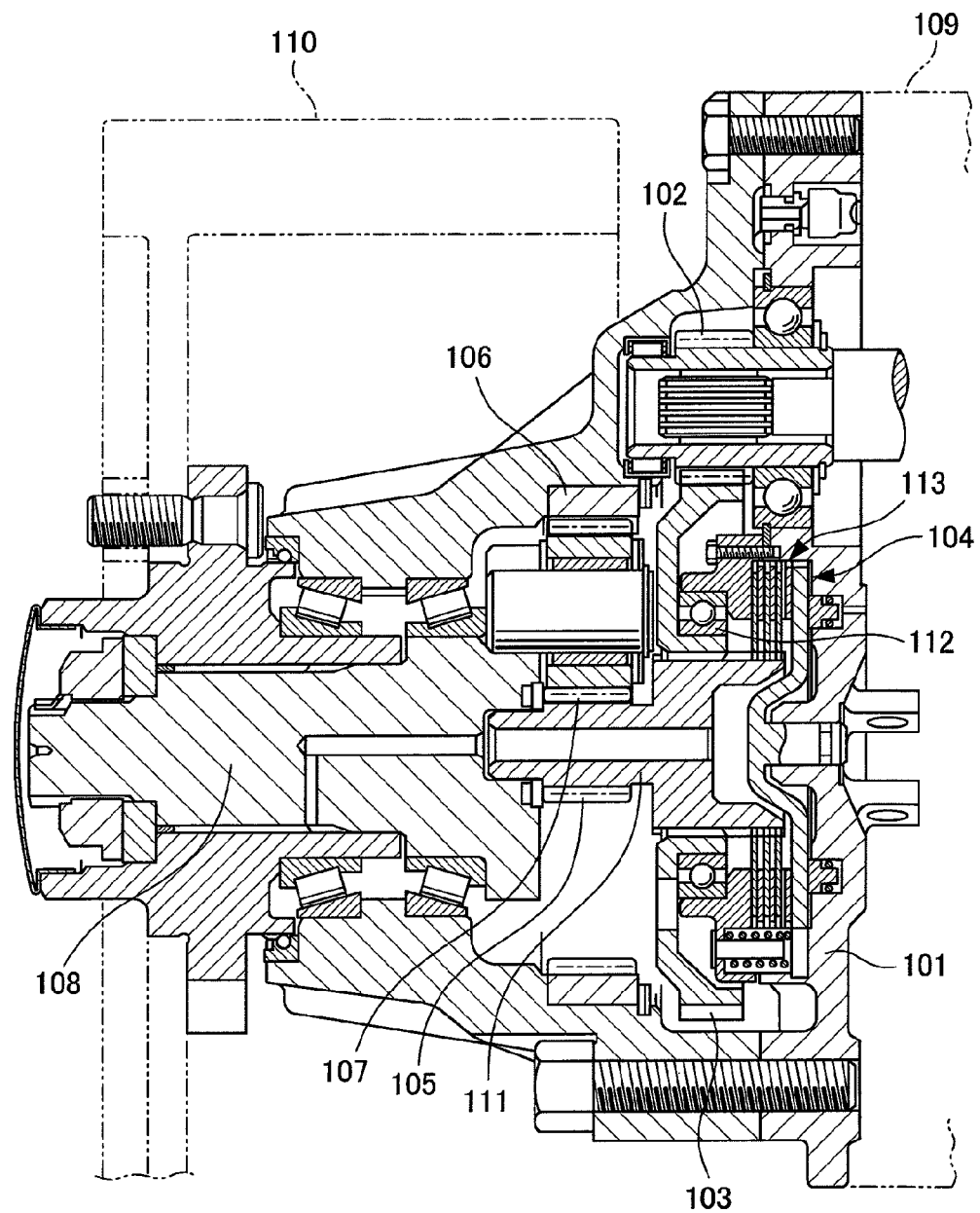
FIG. 4 is a cross-sectional view of a conventional transfer incorporating a wet brake.

FIG. 1 is a cross-sectional view of a transfer incorporating a wet brake according to an embodiment example of the present invention, FIG. 2 is a cross-sectional view of the vicinity of a wet brake (cross-sectional view taken at a position different from the position illustrated in FIG. 1) in the transfer incorporating a wet brake, and FIG. 3 is a side view of the transfer incorporating a wet brake.

The transfer incorporating a wet brake shown in FIGS. 1 to 3 illustrates an application example to a battery forklift. The battery forklift in the illustrated example is configured in such a manner that right and left driving wheels can be driven to rotate by individual drive motors, respectively. For this configuration, a transfer incorporating a wet brake is provided to each of the right and left driving wheels. However, FIGS. 1 to 3 only show the transfer incorporating a wet brake on the left side.

As shown in FIGS. 1 to 3, the transfer incorporating a wet brake of this embodiment example includes, in a case 11, a first gear (input gear) 12, a second gear (drive gear) 13, a wet brake 14, a sun gear 15, a ring gear 16, and multiple planetary gears 17, and further includes an output shaft 18 whose top end side protrudes from the case 11.

The case 11 is formed by integrally connecting a support member 11A which supports the output shaft 11 side and a support member 11B which supports a second gear shaft 22 side, the second gear shaft 22 being a rotary shaft for the second gear 13 and the sun gear 15. In addition, the support member 11B is formed by integrally connecting a support member 11C, a support member 11D (first support member), a support member 11E (second support member), and a cover member 11F together.

The support member 11E is fixed to the inner surface of the support the member 11C (the internal surface of the case) with a bolt 44. The support member 11D is fitted to a hole 11C-1 formed in the support member 11C. A flange portion 11D-2 of the support member 11D is fixed to the outer surface of the support member 11C (the external surface of the case) with a bolt 45 and a bolt 46. A recess 11D-3 is formed on the outer surface of the support member 11D (the external surface of the case). The cover member 11F is fixed to the outer surface of the support member 11D with the bolt 46 in such a manner as to cover the recess 11D-3 of the support member 11D. Moreover, the support member 11A and the support member 11C are connected together with bolts 47. Note that the support members 11C, 11D, 11E, 11F are formed as separate members in consideration of workability but are not limited thereto. These support members maybe formed as an integrated member if appropriate.

The first gear 12 has a cylindrical first gear shaft 19. A rotary shaft 21 of a drive motor (electric motor) 20 is inserted inside the first gear shaft 19. Splines are formed on the inner peripheral surface of the first gear shaft 19. Splines are formed also on the outer peripheral surface of the rotary shaft 21 of the drive motor (electric motor) 20. Thus, the rotary shaft 21 and the first gear shaft 19 are engaged with each other by spline fitting (a spline fitting portion 19A) in such a manner as to be movable in an axial direction but not rotatable relative to each other. Furthermore, the first gear shaft 19 is rotatably supported by a bearing 39 and a bearing 40, the bearing 39 being interposed between the inner surface of the support member 11A of the case 11 and the first gear shaft 19, the bearing 40 being interposed between the inner surface of the support member 11C of the case 11 and the first gear shaft 19.

Thus, when the drive motor 20 is activated by a power supplied from an unillustrated battery, the first gear 12 is driven to rotate by the drive motor 20.

The second gear 13 has a second gear shaft 22 extending horizontally in a vehicle width direction of the forklift, and meshes with the first gear 12. In addition, although the details will be described later, the second gear shaft 22 is rotatably supported by two bearings, i.e., a bearing 42 (first bearing) and a bearing 43 (second bearing). Moreover, the second gear 13 has a larger number of teeth and a larger diameter than the first gear 12.

Thus, when the first gear 12 rotates, the second gear 13 rotates accompanying the first gear 12, together with the second gear shaft 22 at a slower speed than the first gear 12 does, while being supported by the two bearings 42, 43.

Furthermore, the second gear 13 has a peripheral edge portion bent toward a side opposite to the output shaft 18 side, and has a space section 41 formed therein. The wet brake 14 is disposed in the space section 41.

The sun gear 15 is provided at a top end portion of the second gear shaft 22. Thus, when the second gear shaft 22 rotates together with the second gear 13, the sun gear 15 also rotates accompanying the rotation of the second gear shaft 22.

The output shaft 18 is disposed in front of the second gear shaft 22 with a gap between the output shaft 18 and the second gear shaft 22. In other words, the second gear shaft 22 is not constrained to the output shaft 18. Moreover, the output shaft 18 is disposed in such a manner that the rotation center thereof is aligned with the rotation center of the second gear shaft 22. The output shaft 18 extends horizontally in the vehicle width direction of the forklift. Furthermore, the output shaft 18 has a flange portion 23 formed at a base end portion thereof, the flange portion 23 spreading in a direction perpendicular to an axial direction of the output shaft 18.

Each of the multiple planetary gears 17 has a third gear shaft 24. The third gear shaft 24 is fixed to the flange portion 23 of the output shaft 18. An axial direction of the third gear shaft 24 is parallel to the axial direction of the output shaft 18. The planetary gear 17 is rotatably fitted onto the third gear shaft 24 with a bearing 25.

The ring gear 16 is an internal gear, and is disposed in such a manner as to surround the sun gear 15 with the center of the ring gear 16 being aligned with the rotation center of the second gear shaft 22. The ring gear 16 is fixed to the inner surface of the support member 11A of the case 11 with a bolt 26. Each of the planetary gears 17 is disposed between the sun gear 15 and the ring gear 16, and meshes with the sun gear 15 and the ring gear 16.

Thus, when the sun gear 15 rotates, the planetary gears 17 revolve along the internal teeth of the ring gear 16 while turning by themselves. As a result, the output shaft 18 rotates. In this manner, the rotational force of the drive motor 20 serving as the driving source is transmitted to the output shaft 18 through the first gear 12, the second gear 13, the sun gear 15, and the planetary gears 17.

The output shaft 18 is inserted inside a cylindrical wheel shaft 27. Splines are formed on the inner peripheral surface of the wheel shaft 27. Splines are formed also on the outer peripheral surface of the output shaft 18. Thus, the wheel shaft 27 and the output shaft 18 are engaged with each other by spline fitting (a spline fitting portion 18A) in such a manner as to be movable in an axial direction but not rotatable relative to each other. Additionally, the wheel shaft 27 and the output shaft 18 are fastened together with a nut 28 that is screwed onto a screw portion at the top end of the output shaft 18 with a washer 29 interposed therebetween. Note that the wheel shaft 27 may be integrated with the output shaft 18.

The wheel shaft 27 and the output shaft 18 are rotatably supported by two bearings 30, 31 interposed between the wheel shaft 27 and the inner surface of the support member 11A of the case 11. Moreover, the wheel shaft 27 has a flange portion 32 being formed and spreading in a direction perpendicular to the axial direction of the wheel shaft 27. A driving wheel 34 is fixed to the flange portion 32 with a bolt 33. Thus, when the wheel shaft 27 rotates together with the output shaft 18, the driving wheel 34 rotates accordingly.

Furthermore, this transfer incorporates the wet brake 14 as braking means for decelerating or ceasing the rotation of the driving wheel 34. Although the illustration is omitted, a lubricating oil is stored in the case 11. A brake disc unit 35 of the wet brake 14, and the like are immersed in the lubricating oil.

The wet brake 14 includes the aforementioned brake disc unit 35 and a brake hub 36 which is provided in such a manner that the brake hub 36 is rotatable with the second gear 13 and the second gear shaft 22 in an integrated manner. Moreover, the brake disc unit 35 has multiple rotating-side brake discs 35A, multiple fixed-side brake discs 35B, and a press brake disc 35C.

The rotating-side brake discs 35A are attached to an outer peripheral portion of the brake hub 36. The fixed-side brake discs 35B are disposed to face the rotating-side brake discs 35A. In other words, the rotating-side brake discs 35A and the fixed-side brake discs 35B are alternately disposed in an axial direction of the brake hub 36 (second gear shaft 22). The press brake disc 35C is disposed at the farthest edge in the brake disc unit 35 in the axial direction. The press brake disc 35C is used at the time of braking to press the rotating-side brake discs 35A and the fixed-side brake discs 35B that are alternately disposed.

The second gear 13 is fixed to the brake hub 36 with bolts 37. The brake hub 36 has a cylindrical shape, and has a base end portion of the second gear shaft 22 inserted therein. Splines are formed on the inner peripheral surface of the brake hub 36. Splines are formed also on the outer peripheral surface of the base end portion of the second gear shaft 22. Thus, the brake hub 36 and the second gear shaft 22 are engaged with each other by spline fitting (a spline fitting portion 22A) in such a manner as to be movable in an axial direction but not rotatable relative to each other.

The brake hub 36 has a recess 36*a* formed on the base end thereof. Meanwhile, the support member 11D of the case 11 has a projection 11D-1 formed thereon. The projection 11D-1 is disposed inside the recess 36*a* on the base end of the brake hub 36. Furthermore, the first bearing 42 is interposed between the projection 11D-1 on the support member 11D and the inner peripheral surface of the recess 36*a* of the brake hub 36. In addition, the support member E of the case 11 has a hole 11E-1 formed therein. An top end portion of the brake hub 36 is positioned inside the hole 11E-1. In other words, the support member 11E of the case 11 surrounds the top end portion of the brake hub 36. Moreover, the second bearing 43 is interposed between the support member 11E of the case 11 and the top end portion of the brake hub 36.

Thus, the brake hub 36 and the second gear shaft 22 are rotatably supported by the two bearings, i.e., the bearing 42 located on the base end side and the inner side of the brake hub 36 and the bearing 43 located on the top end side and the outer side of the brake hub 36.

Furthermore, splines are formed also on the outer peripheral surface of the base end portion of the brake hub 36. Meanwhile, the rotating-side brake discs 35A are ring shaped, and each have irregularities (splines) formed on an inner peripheral portion thereof. Thus, the rotating-side brake discs 35A and the brake hub 36 are engaged with each other by spline fitting (a spline fitting portion 36A) in such a manner as to be movable in an axial direction but not rotatable relative to each other.

Holes 35B-1 are formed in outer peripheral portions of the fixed-side brake discs 35B, and guide pins 48 are each inserted through the holes 35B-1. Each of the guide pin 48 is disposed in such a manner that a longitudinal direction thereof is parallel to the axial direction of the second gear shaft 22. Both end portions of the guide pin 48 are fixed respectively to the support member 11C and the support member 11E of the case 11 that face each other in the axial direction. Thus, the fixed-side brake discs 35B are inhibited from rotating by the guide pin 48 while being movable in the axial direction along the guide pin 48. Note that multiple (four in the illustrated example) guide pins 48 are provided, and are arranged at equal intervals in a circumferential direction of the brake disc unit 35.

The guide pin 48 is further inserted through a hole 35C-1 formed in an outer peripheral portion of the press brake disc 35C. Thus, the press brake disc 35C is also inhibited from rotating by the guide pin 48, while being movable in the axial direction along the guide pin 48.

Thus, when the rotating-side brake discs 35A and the fixed-side brake discs 35B which are alternately disposed are pressed by the press brake disc 35C toward the support member 11E (leftward in FIG. 1), these brake discs 35A, 35B are moved in the axial direction and brought into close contact with one another while being sandwiched between the press brake disc 35 and the support member 11E. Thereby, a braking force is generated. When the pressing by the press brake disc 35C is terminated, the press brake disc 35C is returned to a direction opposite to the pressing direction by a spring force of a coil spring (the illustration is omitted). Hence, the brake discs 35A, 35B are separated from one another, thereby releasing the braking force.

Here, the pressing operations of the press brake disc 35C during braking are performed through two means, i.e., multiple (three, for example) disc pressing pins 49 for foot brake and multiple (three, for example) disc pressing pins 50 for parking brake.

Each of the disc pressing pins 49 is disposed between the support member 11C and the support member 11D of the case 11, and is moved in the axial direction of the second gear shaft 22. The disc pressing pin 49 is operated with an oil pressure. Thus, when an operator steps on a foot brake, a pressure oil is supplied from an oil pressure source to a pressure oil supply port 56 provided at the cover member 11F of the case 11. The pressure oil is then supplied to the disc pressing pin 49 through an oil path (the illustration is omitted) provided in the case 11. Thereby, the disc pressing pin 49 presses the press brake disc 35C. As a result, the pressing operation by the press brake disc 35C is started, and a braking force is generated in the brake disc unit 35. Note that multiple (three, for example) disc pressing pins 49 are provided, and are disposed at equal intervals in a circumferential direction of the press brake disc 35C.

In the support member 11D of the case 11, multiple (three in illustrated example) holes 11D-4 are formed at portions around the projection 11D-1. Here, the multiple disc pressing pins 50 are inserted through these holes 11D-4, respectively, so that the disc pressing pins 50 are movable in the axial direction of the second gear shaft 22. The number of the disc pressing pins 50 is desirably three or larger. In the illustrated example, the three disc pressing pins 50 are arranged at equal intervals in the circumferential direction of the press brake disc 35C (a pressing plate 51).

The pressing plate 51 is used to press the multiple (three) disc pressing pins 50 simultaneously, and is disposed in a space section between the support member 11D and the cover member 11F of the case 11, that is, in the recess 11D-3 of the support member 11D. The pressing plate 51 is disc shaped and arranged in such a manner that the center thereof is aligned with the center of the press brake disc 35C and the center of the second gear shaft 22.

Moreover, a hole 51a is formed in a central portion of the pressing plate 51. A shank portion 52b of a plate pressing pin 52 is inserted through the hole 51a. There is some gap between the inner peripheral surface of the hole 51a in the pressing plate 51 and the outer peripheral surface of the shank portion 52a of the plate pressing pin 52. This allows the pressing plate 51 to tilt to some extent.

In addition, the shank portion 52b of the plate pressing pin 52 is inserted also into a hole 11D-5 formed in the projection 11D-1 on the support member 11D of the case 11. Meanwhile, a head portion 52a of the plate pressing pin 52 is a portion formed to have a larger diameter than the shank portion 52b. The head portion 52a comes into contact with a central portion (a peripheral edge portion of the hole 51a) of a side surface of the pressing plate 51, so that the head portion 52a can press the central portion (the peripheral edge portion of the hole 51a). Furthermore, the plate pressing pin 52 is movable in the axial direction of the second gear shaft 22 with the head portion 52a being inserted through a hole 11F-2 formed in the cover member 11F of the case 11.

On the outer side of the cover member 11F of the case 11, pin pressing means which has a rotation shaft 53 and a lever 54 is provided. Both end portions of the rotation shaft 53 are supported by a support portion 11F-1 provided to protrude from the cover member 11F, and the lever 54 is provided rotatably about the rotation shaft 53. The base end side of the lever 54 is longer than the top end side thereof in distance from the rotation shaft 53 serving as the fulcrum. The base end portion of the lever 54 serves as the power point while the top end portion (head portion) 54a of the lever 54 serves as the point of application. Although the illustration is omitted, the base end portion of the lever 54 is connected to a parking brake lever through a link mechanism such as a wire.

Thus, when the operator pulls on the parking brake lever, the lever 54 rotates about the rotation shaft 53, and the head portion 54a of the lever 54 presses the head portion 52a of the plate pressing pin 52 toward the support member 11E (leftward in FIG. 1). Hence, the head portion 52a of the plate pressing pin 52 presses the pressing plate 51 at one point on the central portion of the pressing plate 51 toward the support member 11E. The pressing plate 51 presses the multiple disc pressing pins 50 toward the support member 11E simultaneously. These disc pressing pins 50 press the press brake disc 35C toward the support member 11E simultaneously. As a result, the pressing operation by the press brake disc 35C is started, and a braking force is generated in the brake disc unit 35.

As has been described above, the transfer incorporating a wet brake of this embodiment is a transfer incorporating a wet brake, comprising, in a case 11: a first gear 12 having a first gear shaft 19 connected to a rotary shaft 21 of a drive motor 20 (driving source); a second gear 13 having a second gear shaft 22 and meshing with the first gear 12; a wet brake 14 disposed on a base end side of the second gear shaft 22; a sun gear 15 provided at a top end portion of the second gear shaft 22; a ring gear 16 disposed in such a manner as to surround the sun gear 15; and a plurality of planetary gears 17 disposed between the sun gear 15 and the ring gear 16 and meshing with the sun gear 15 and the ring gear 16; and further comprising: an output shaft 18 having a flange portion 23 (base end portion) to which third gear shafts 24 of the planetary gears 17 are attached and having a top end side protruding from the case 11 (support member 11A), the transfer incorporating a wet brake thereby configured to transmit a rotational force of the drive motor 20 to the output shaft 18 through the first gear 12, the second gear 13, the sun gear 15, and the planetary gears 17, the transfer incorporating a wet brake characterized in that the wet brake 14 includes: a brake hub 36 provided in such a manner as to be rotatable with the second gear and the second gear shaft 22 in an integrated manner; a rotating-side disc 35A attached to an outer peripheral portion of the brake hub 36; a fixed-side brake disc 35B disposed to face the rotating-side brake disc 35A; and a press brake disc 35C for pressing the rotating-side brake disc 35A and the fixed-side brake disc 35B, the brake hub 36 and the second gear shaft 22 are rotatably supported by a bearing 42 and a bearing 43, the bearing 42 interposed between a projection 11D-1 of a support member 11D of the case 11 and an inner peripheral surface of a recess 36a formed on a base end of the brake hub 36, the projection 11D-1 disposed on an inner side of the recess 36a, the bearing 43 interposed between a support member 11E of the case 11 and a top end portion of the brake hub 36, the support member 11E surrounding the top end portion of the brake hub 36, the transfer further comprises: a plurality of disc pressing pins 50 respectively inserted through a plurality of holes 11D-4 formed in the support member 11D; a pressing plate 51 disposed on an outer side of the support member 11D; and plate pressing means, and the transfer incorporating a wet brake is thereby configured such that the plate pressing means presses the pressing plate 51 (presses at one point on a central portion of the pressing plate 51), the pressing plate 51 presses the disc pressing pins 50, and the disc pressing pins 50 press the press brake disc 35C. Accordingly, operations and effects as follows are obtained.

Specifically, the second gear shaft 22 can be supported by the two bearings, i.e., a bearing 42 and a bearing 43. Thus, even when helical gears are employed as the second gear 13 and the sun gear 15, the mesh condition between the first gear 12 and the second gear 13 and the mesh condition between the sun gear 15 and the planetary gears 17 are stable. Hence, gear noises are less likely to be generated, and the variation in the gear noises is also reduced.

Furthermore, the brake hub 36 is supported on the inner side and the outer side thereof by the bearing 42 and the bearing 43, and the press brake disc 35C of the wet brake 14 is pressed by a simple configuration of the disc pressing pins 50 and the pressing plate 51. Accordingly, problems such as an increase in the axial dimension of the transfer, complex structure of the transfer, and poor assemblability of the transfer no longer occur.

Moreover, in the transfer incorporating a wet brake of this embodiment, the pressing plate 51 is disposed in a space section (recess 11D-3) formed between the support member 11D of the case 11 and a cover member 11F of the case 11 covering the support member 11D, the plate pressing means includes pin pressing means and a plate pressing pin 52 inserted through a hole 11F-2 formed in the cover member 11F, and the pin pressing means presses the plate pressing pin 52, and the plate pressing pin 52 presses the pressing plate 51 (presses one point on the central portion of the pressing plate 51). Accordingly, the pressing plate 51 can be surely pressed by the plate pressing means of a simple configuration.

Moreover, in the transfer incorporating a wet brake of this embodiment, the plate pressing pin 52 has: a head portion 52a inserted through the hole 11F-2 formed in the cover member 11F, and configured to press the pressing plate 51; a shank portion 52b inserted through a hole 51a formed in the pressing plate 51. Since the shank portion 52b of the plate pressing pin 52 is inserted through the hole 51a in the pressing plate 51, the posture of the pressing plate 51 is stabilized, and the pressing plate 51 can be surely pressed by the head portion 52a of the plate pressing pin 52.

Moreover, in the transfer incorporating a wet brake of this embodiment, a gap 57 is formed between an inner peripheral surface of the hole 51a formed in the pressing plate 51 and an outer peripheral surface of the shank portion 52b of the plate pressing pin 52. The gap between the inner peripheral surface of the hole 51a and the outer peripheral surface of the shank portion 52b allows the pressing plate 51 to tilt. Accordingly, even if the plurality of disc pressing pins are dimensionally different due to production errors, the dimensional error is absorbed by the tilting of the pressing plate 51, and thus the plurality of disc pressing pins 50 can be surely pressed by the pressing plate 51.

Furthermore, in the transfer incorporating a wet brake of this embodiment, the brake hub 36 is spline fitted to a base end portion of the second gear shaft 22. Accordingly, the second gear shaft 22 is not constrained to the output shaft side. Moreover, the second gear shaft 22 is spline fitted to the brake hub 36. Accordingly, even if the center of the second gear shaft 22 is misaligned with the center of the ring gear 16 due to a dimensional error, the misalignment is adjusted (absorbed at the spline fitting portion), making it possible to prevent torque from being transmitted ununiformly among the planetary gears 17.

Note that the configuration of the pin pressing means is not limited to the configuration where the lever 54 rotates about the rotation shaft 53 as described above. It is only necessary that the pin pressing means be configured to press the plate pressing pin 52.

Moreover, although the plate pressing means includes the pin pressing means and the plate pressing pin 52, the configuration of the plate pressing means is not limited to the configuration as described above, either. It is only necessary that the plate pressing means be configured to press the pressing plate 51 at one point on the central portion of the pressing plate 51.

Furthermore, the transfer incorporating a wet brake of the present invention can be applied, as a transfer, not only to the battery forklift but also to other vehicles and the like.

INDUSTRIAL APPLICABILITY

The present invention relates to a transfer incorporating a wet brake, and is useful when being applied as a transfer incorporating a wet brake to a battery forklift, and the like.

EXPLANATION OF REFERENCE NUMERALS 11 case, 11A, 11B, 11C, 11D, 11E, 11F support member, 11C-1 hole, 11D-1 projection, 11D-2 flange portion, 11D-3 recess, 11D-4, 11D-5 hole, 11E-1 hole, 11F-1 support portion, 11F-2 hole, 12 first gear, 13 second gear, 14 wet brake, 15 sun gear, 16 ring gear, 17 planetary gear, 18 output shaft, 18A spline fitting portion, 19 first gear shaft, 19A spline fitting portion, 20 drive motor, 21 rotary shaft, 22 second gear shaft, 22A spline fitting portion, 23 flange portion, 24 third gear shaft, 25 bearing, 26 bolt, 27 wheel shaft, 28 nut, 29 washer, 30, 31 bearing, 32 flange portion, 33 bolt, 34 driving wheel, 35 brake disc unit, 35A rotating-side brake disc, 35B fixed-side brake disc, 35B-1 hole, 35C press brake disc, 35C-1 hole, brake hub, 36A spline fitting portion, 36a recess, 37 bolt, 39, 40 bearing, 41 space section, 42, 43 bearing, 44, 45, 46, 47 bolt, 48 guide pin, 49 disc pressing pin, 50 disc pressing pin, 51 pressing plate, 51a hole, 52 plate pressing pin, 52a head portion, 52b shank portion, 53 rotation shaft, 54 lever, 54a head portion, 56 pressure oil supply port, 57 gap

The invention claimed is:

1. A transfer incorporating a wet brake, comprising, in a case:
a first gear having a first gear shaft connected to a rotary shaft of a driving source;
a second gear having a second gear shaft and meshing with the first gear;
a wet brake disposed on a base end side of the second gear shaft;
a sun gear provided at a top end portion of the second gear shaft;
a ring gear disposed in such a manner as to surround the sun gear; and
a plurality of planetary gears disposed between the sun gear and the ring gear and meshing with the sun gear and the ring gear; and
an output shaft having a base end portion to which third gear shafts of the planetary gears are attached and having a top end side protruding from the case,
wherein the wet brake is configured to transmit a rotational force of the driving source to the output shaft through the first gear, the second gear, the sun gear, and the planetary gears,
the wet brake includes:
a brake hub provided in such a manner as to be rotatable with the second gear and the second gear shaft as a unit;
a rotating-side brake disc attached to an outer peripheral portion of the brake hub;
a fixed-side brake disc disposed in such a manner as to face the rotating-side brake disc; and
a press brake disc for pressing the rotating-side brake disc and the fixed-side brake disc,
the brake hub and the second gear shaft are rotatably supported by a first bearing and a second bearing, the first bearing interposed between a projection of a first support member of the case and an inner peripheral surface of a recess formed on a base end of the brake hub, the projection disposed on an inner side of the recess, to support radial and axial loads between the brake hub and the first support member, the second bearing interposed between a second support member of the case and a top end portion of the brake hub, the second support member surrounding the top end portion of the brake hub, to support radial and axial loads between the brake hub and the second support member, the transfer further comprises:

a plurality of disc pressing pins respectively inserted through a plurality of holes formed in the first support member;

a pressing plate disposed on an outer side of the first support member; and a plate pressing unit, and the transfer incorporating a wet brake is thereby configured such that the plate pressing unit presses the pressing plate, the pressing plate presses the disc pressing pins, and the disc pressing pins press the press brake disc.

2. The transfer incorporating a wet brake according to claim 1, wherein the pressing plate is disposed in a space section formed between the first support member of the case and a cover member of the case covering the first support member, the plate pressing unit includes pin pressing means and a plate pressing pin inserted through a hole formed in the cover member, and the pin pressing means presses the plate pressing pin, and the plate pressing pin presses the pressing plate.

3. The transfer incorporating a wet brake according to claim 2, wherein the plate pressing pin has:

a head portion inserted through the hole formed in the cover member, and configured to press the pressing plate;

a shank portion inserted through a hole formed in the pressing plate.

4. The transfer incorporating a wet brake according to claim 3, wherein a gap is formed between an inner peripheral surface of the hole formed in the pressing plate and an outer peripheral surface of the shank portion of the plate pressing pin.

5. The transfer incorporating a wet brake according to claim 1, wherein the brake hub is spline fitted to a base end portion of the second gear shaft.

6. The transfer incorporating a wet brake according to claim 2, wherein the brake hub is spline fitted to a base end portion of the second gear shaft.

7. The transfer incorporating a wet brake according to claim 3, wherein the brake hub is spline fitted to a base end portion of the second gear shaft.

8. The transfer incorporating a wet brake according to claim 4, wherein the brake hub is spline fitted to a base end portion of the second gear shaft.

* * * * *